United States Patent [19]

West et al.

[11] Patent Number: 5,399,095

[45] Date of Patent: Mar. 21, 1995

[54] VARIABLE PHASE POSITIONING DEVICE

[75] Inventors: Rodney J. West, Liberty, Ind.; Lisa C. Simmering, Fair Play, S.C.

[73] Assignee: Square D Company, Palatine, Ill.

[21] Appl. No.: 207,868

[22] Filed: Mar. 8, 1994

Related U.S. Application Data

[63] Continuation-in-part of Ser. No. 85,341, Jun. 30, 1993, which is a continuation-in-part of Ser. No. 912,071, Jul. 8, 1992, Pat. No. 5,266,044, which is a continuation of Ser. No. 675,389, Mar. 26, 1991, abandoned.

[51] Int. Cl.$^6$ ............................................. H01R 4/38
[52] U.S. Cl. .................................... 439/320; 439/210
[58] Field of Search ......................... 439/598, 210–212, 439/110, 692, 660, 903, 682, 733, 320, 321

[56] References Cited

U.S. PATENT DOCUMENTS

| | | | |
|---|---|---|---|
| 2,662,219 | 12/1953 | Hennessey, Jr. et al. | 439/598 |
| 3,649,956 | 3/1972 | Vrobel | 439/598 |
| 3,885,849 | 5/1975 | Bailey et al. | 439/903 |
| 5,295,866 | 3/1994 | Kroger et al. | 439/903 |

Primary Examiner—David Pirlot
Attorney, Agent, or Firm—Larry I. Golden; David R. Stacey

[57] ABSTRACT

A device for resolving axial and angular misalignments between electrical conductors of adjacent sections of a pre-bussed rigid conduit electrical feeder system. The variable phase positioning device includes a flexible housing with an end piece attached to each end. A number of flexible electrical conductors are enclosed within the housing. Each conductor is enclosed in an electrically insulating sheath. A substantially rigid terminal is fixedly attached to each end of each conductor. At each end of the housing the terminals are loosely captivated within a terminal support such that each terminal can rotate freely. The terminal supports are made from an electrically insulating material. A retaining sleeve is loosely received over each terminal support and attached to the end piece in a manner that permits the terminal supports to rotate freely within the retaining sleeve.

1 Claim, 7 Drawing Sheets

VARIABLE PHASE POSITIONING DEVICE

This application is a continuation-in-part of U.S. application Ser. No. 08/085,341, filed Jun. 30, 1993, which is a continuation-in-part of U.S. application Ser. No. 07/912,071, filed Jul. 8, 1992, now issued as U.S. Pat. No. 5,266,044, a continuation of U.S. application Ser. No. 07/675,389, filed Mar. 26, 1991, now abandoned.

FIELD OF THE INVENTION

Electrical distribution feeder systems for use in industrial and commercial locations.

BACKGROUND OF THE INVENTION

In an electrical distribution feeder system as disclosed in U.S. Pat. No. 5,266,044 and U.S. patent application Ser. No. 08/085,341 and hereby incorporated by reference, it is possible for the ends of adjoining sections to become axially misaligned or for the conductors to become angularly displaced. The axial misalignments usually occur in long runs and can result from misaligned system supports or obstacles such as structural supports, pipes or ductwork which the electrical distribution system sections must be routed around. Angular misalignment between adjacent sections can occur in long runs as a result of slight twists in the enclosure due to the extruding process.

SUMMARY OF THE INVENTION

The present invention provides a variable phase positioning device for solving axial and angular misalignments between electrical conductors of adjacent sections of a pre-bussed rigid conduit electrical feeder system. A first objective is accomplished by providing a flexible protective housing for enclosing a number of flexible electrical conductors. A rigid terminal is attached to each end of each flexible conductor such that the terminals extend outwardly past the ends of the housing. The housing and its enclosed electrical conductors can be oriented such that the longitudinal axis of the extending terminals at one end of the housing is not the same as the longitudinal axis of the extending terminals at the other end of the housing.

A second objective is accomplished by providing a rotatable terminal support at each end of the housing. Each terminal support is assembled to the flexible housing such that it can rotate with respect to the housing. Each electrical terminal is securely held in the terminal support in such a manner that it can rotate independently of the other terminals in that terminal support.

It is also an objective of the invention to provide a means of routing around obstacles such as structural members, piping or ductwork while maintaining the overall axial alignment of the pre-bussed rigid conduit feeder system.

Other features and advantages of the invention will become apparent to those skilled in the art upon review of the following detailed description, claims and drawings.

Before one embodiment of the invention is explained in detail, it is to be understood that the invention is not limited in its application to the details of construction and description or illustrated in the drawings. The invention is capable of other embodiments and of being practiced or being carried out in various other ways. Also, it is to be understood that the phraseology and terminology used herein is for the purpose of description and should not be regarded as limiting.

DESCRIPTION OF THE PREFERRED EMBODIMENT

Figure 1:
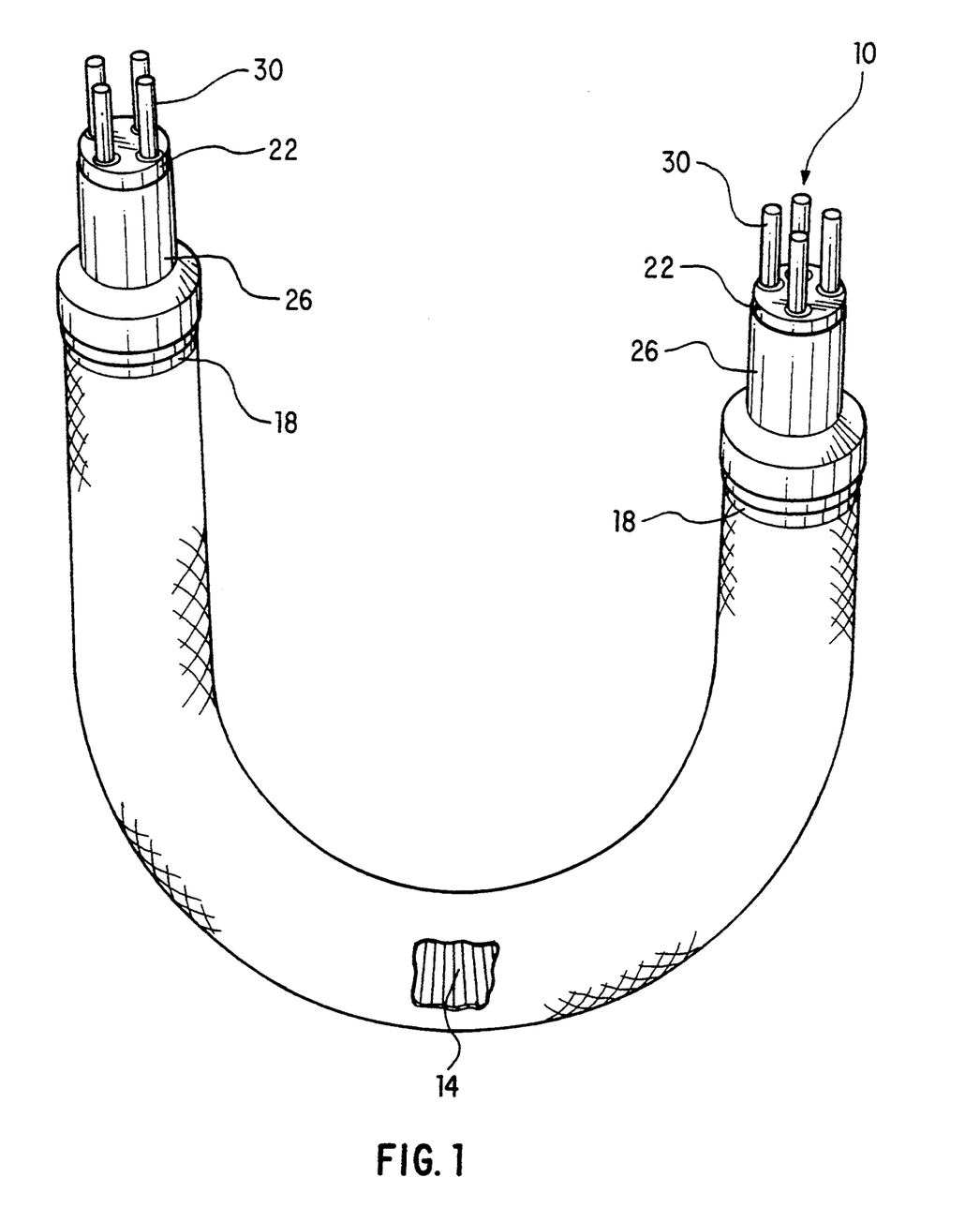
FIG. 1 illustrates an assembled section of a variable phase positioning device made in accordance with the present invention.
Figure 2:
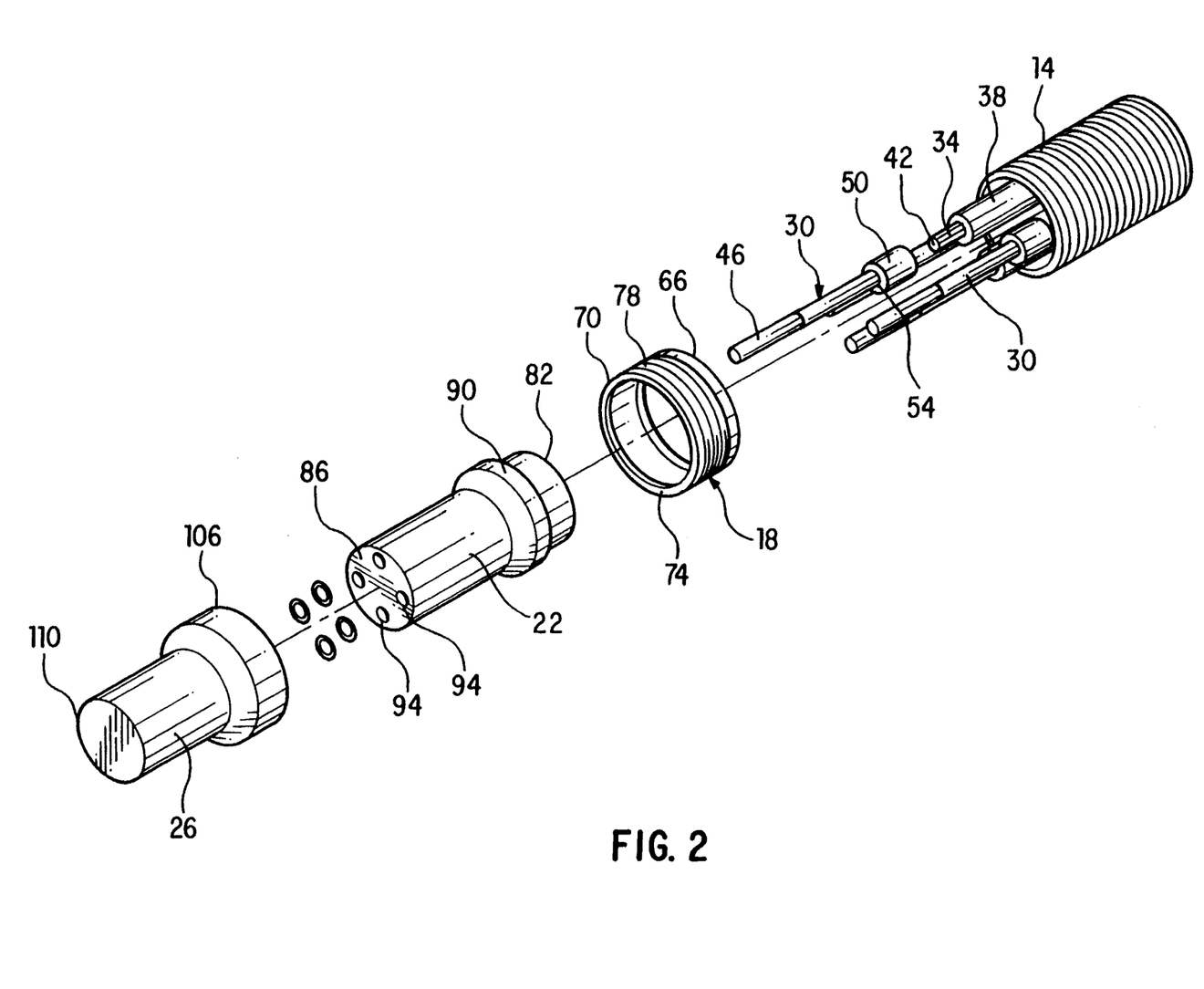
FIG. 2 is an exploded view one end of a variable phase positioning device according to the present invention.

FIG. 1 illustrates a variable phase positioning device, generally indicated by reference numeral 10, constructed in accordance with the present invention. The variable phase positioning device 10 includes a flexible housing 14 having two ends. Proximate each of the two ends are an end piece 18, a terminal support 22, a retaining sleeve 26 and a plurality of electrical terminals 30. The housing 14 is generally tubular in shape and made from a commercially available flexible metallic tubing such as corrugated hose, interlocked hose or liquid tight conduit. By the nature of its design, flexible metallic tubing generally has an expanded length and a compressed length, the compressed length being shorter than the expanded length. One or more flexible electrical conductors 34, as shown in FIG. 2, are provided for each electrical phase in the distribution system. The number of electrical conductors 34 required for each phase is determined by the current rating of the electrical distribution system to which the variable phase positioning device 10 is connected and the current rating of the electrical conductors 34 employed in the variable phase positioning device 10. The length of each conductor 34 is determined by the expanded length of the housing 14. The conductors 34 are of sufficient length that they will not be pulled taught when the housing 14 is at its maximum expanded length. The inside diameter of the housing 14 is dimensioned such that the conductors 34 will not be prohibited from rotating within the housing 14 when the housing 14 is at its fully compressed length. Since both ends of the variable phase positioning device 10 of the present invention include the same type and number of elements, the following description will be limited to one end of the device.

Figure 3:
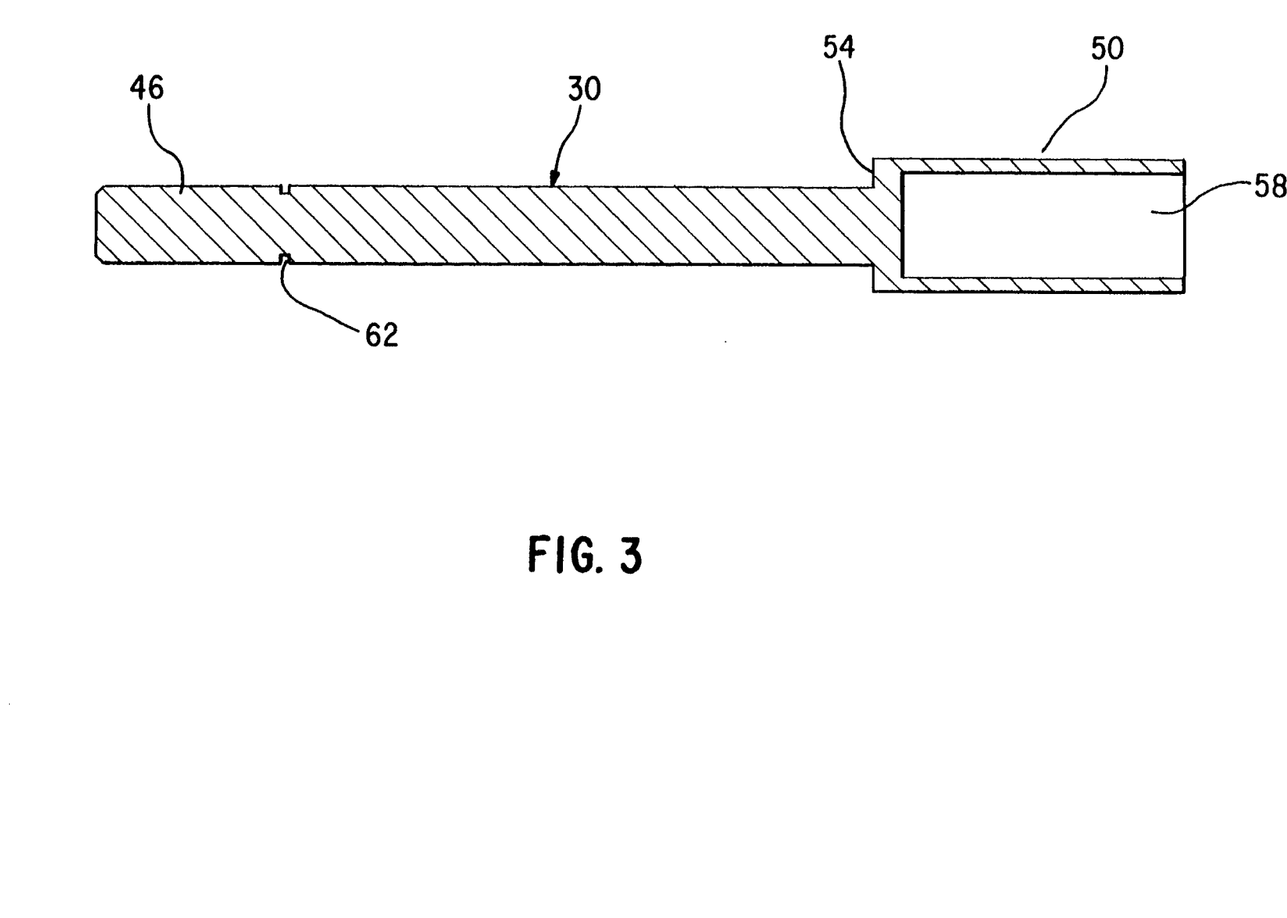
FIG. 3 is a cross-sectional view of a terminal of a variable phase positioning device according to the present invention.

Referring now to FIG. 2, it can be seen that each of the conductors 34 is surrounded by an electrically insulating sheath 38. Each conductor 34 has an end 42 from which a preselected length of the sheath 38 is removed, thereby exposing the surface of the conductor. The terminals 30 are substantially rigid and generally cylindrical in shape. Each terminal 30 has an extending end 46, a conductor receiving end 50 and a step 54. Referring now to FIG. 3, it can be seen that the conductor receiving end 50 has a larger outside diameter than the extending end 46, thereby forming the step 54 at their junction. The conductor receiving end 50 defines an aperture 58 having a preselected depth. The preselected depth of the aperture 58 determines the length of the sheath 38 removed from the end 42 of the conductor 34. The diameter of the aperture 58 is sufficient to receive the end 42 of the conductor 34 which is inserted into the aperture 58 and secured therein by a suitable means such as crimping or binding screws. In the preferred embodiment the means for securing the conductor 34 within the aperture 58 will provide a good electrical connection between the conductor 34 and the terminal 30. The terminal 30 also includes a circumferential retaining groove 62 near the extending end 46.

Figure 4:
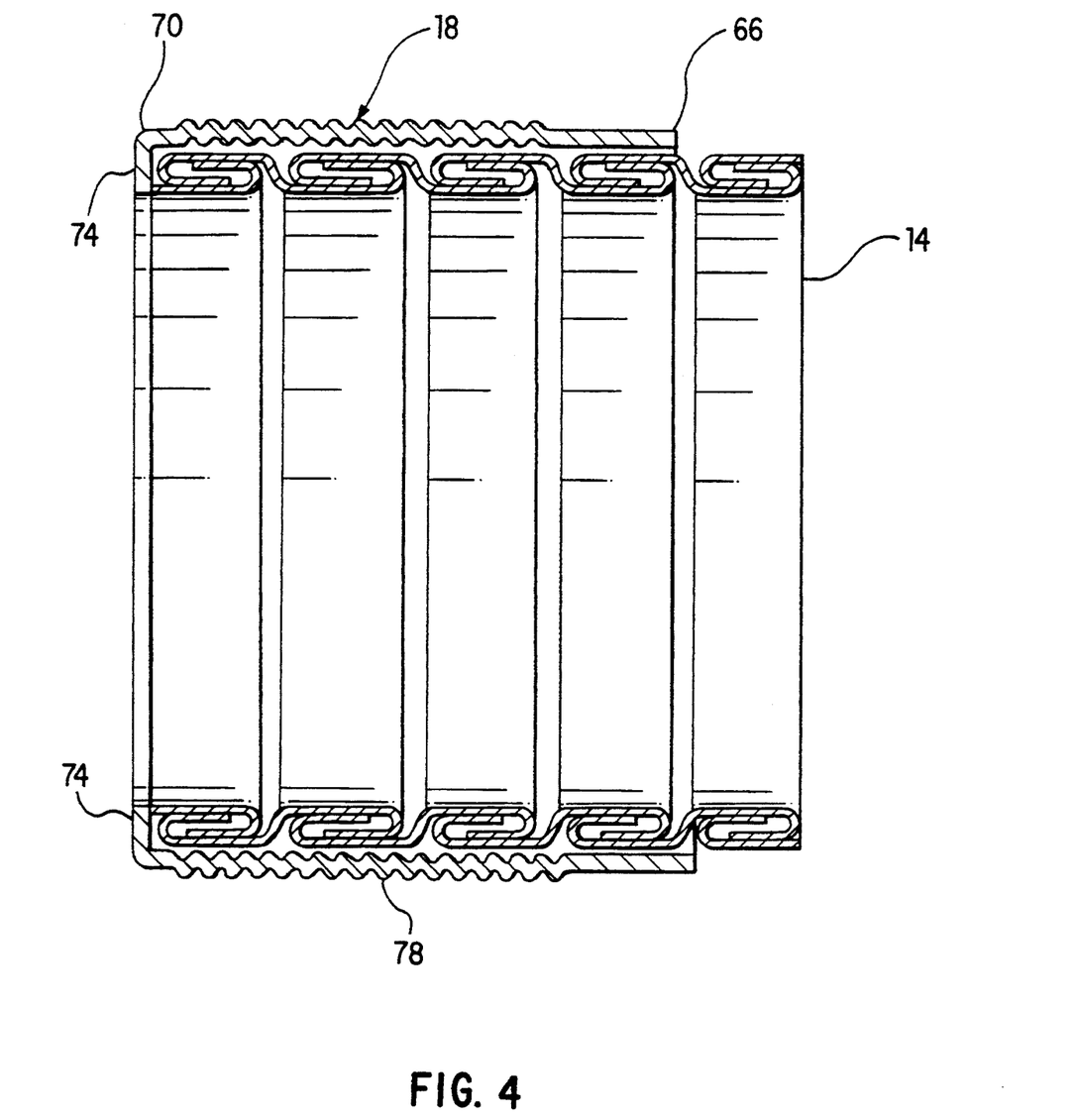
FIG. 4 is a cross-sectional view showing a threadable end piece installed on the end of a flexible housing of a variable phase positioning device according to the present invention.

Referring again to FIG. 2, it can be seen that the end piece 18 is generally tubular in shape, defining a passage which communicates between a housing end 66 and a terminal support end 70. Referring now to FIG. 4 for more detail, the housing end 66 defines an aperture dimensioned to snugly and slidably receive an end of the housing 14. At the terminal support end 70 a bearing flange 74 extends inwardly, thereby defining an aperture of smaller diameter than the aperture at the housing end 66. The end of the housing 14 is slidably received through the housing end 66 until it abuts the bearing flange 74 which forms a stop thereby preventing the housing 14 from passing through the terminal end 70. After installing the end piece 18 on the end of the housing 14 it is fixedly attached to the housing 14 by means such as welding or crimping along the housing end 66. The end piece 18 also has a threaded outside surface 78.

Figure 5:
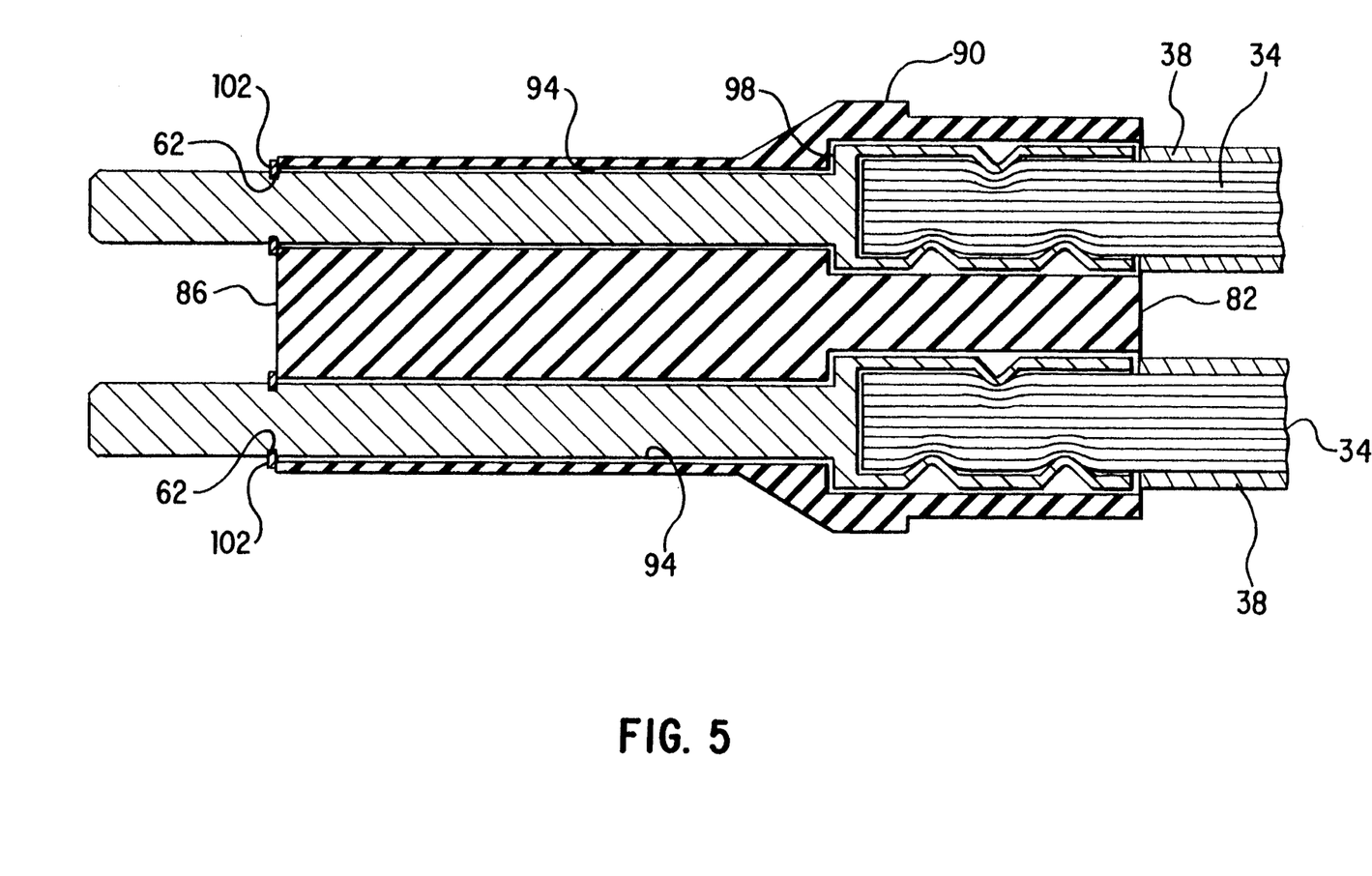
FIG. 5 is a cross-sectional of a terminal support of a variable phase positioning device according to the present invention.

Referring again to FIG. 2, the terminal support 22 is generally cylindrical in shape and made from an electrically insulating material. It has a first end 82, a second end 86 and an annular bearing flange 90 positioned near the first end 82. The first end 82 is sized to be loosely received through the aperture defined by the bearing flange 74 of the end piece 18. The terminal support 22 defines a number of terminal passages 94, each communicating between the first and second ends, 82 and 86 respectively. Referring now to FIG. 5 for greater detail, it can be seen that the diameter of the passages 94 at the first end 82 is sized to receive the conductor receiving end 50 of the terminal 30 while the diameter at the second end 86 is sized to receive the extending end 46 of the terminal 30. A step 98 is formed at the junction of the two diameters of the passage 94. When the terminal 30 is fully inserted into the passage 94 the step 98 in the passage 94 engages the step 54 of the terminal 30 preventing further insertion into the passage 94. At this point the terminal 30 is loosely captivated in the passage 94 by a retaining ring 102 which is received in the circumferential retaining groove 62. The retaining ring 102 engages the second end 86 of the terminal support 22 preventing the terminal form pulling out of the passage 94. Since the terminal 22 is loosely retained in the passage 94 it can rotate freely within the passage 94.

Referring again to FIG. 2, the retaining sleeve 26 is generally cylindrical in shape defining a hollow passage between a first end 106 and a second end 110. The first end 106 has an internal thread and is sized to be threadably received on the external threaded surface 78 of the end piece 18. The inside diameter of the second end 110 is sized to receive the second end 86 of the terminal support 22. The flange 90 of the terminal support 22 is loosely captivated between the bearing flange 74 of the end piece 18 and a step 114 in the retaining sleeve 26. The loose captivation permits the terminal support 22 to rotate freely inside the retaining sleeve 26.

Figure 6:
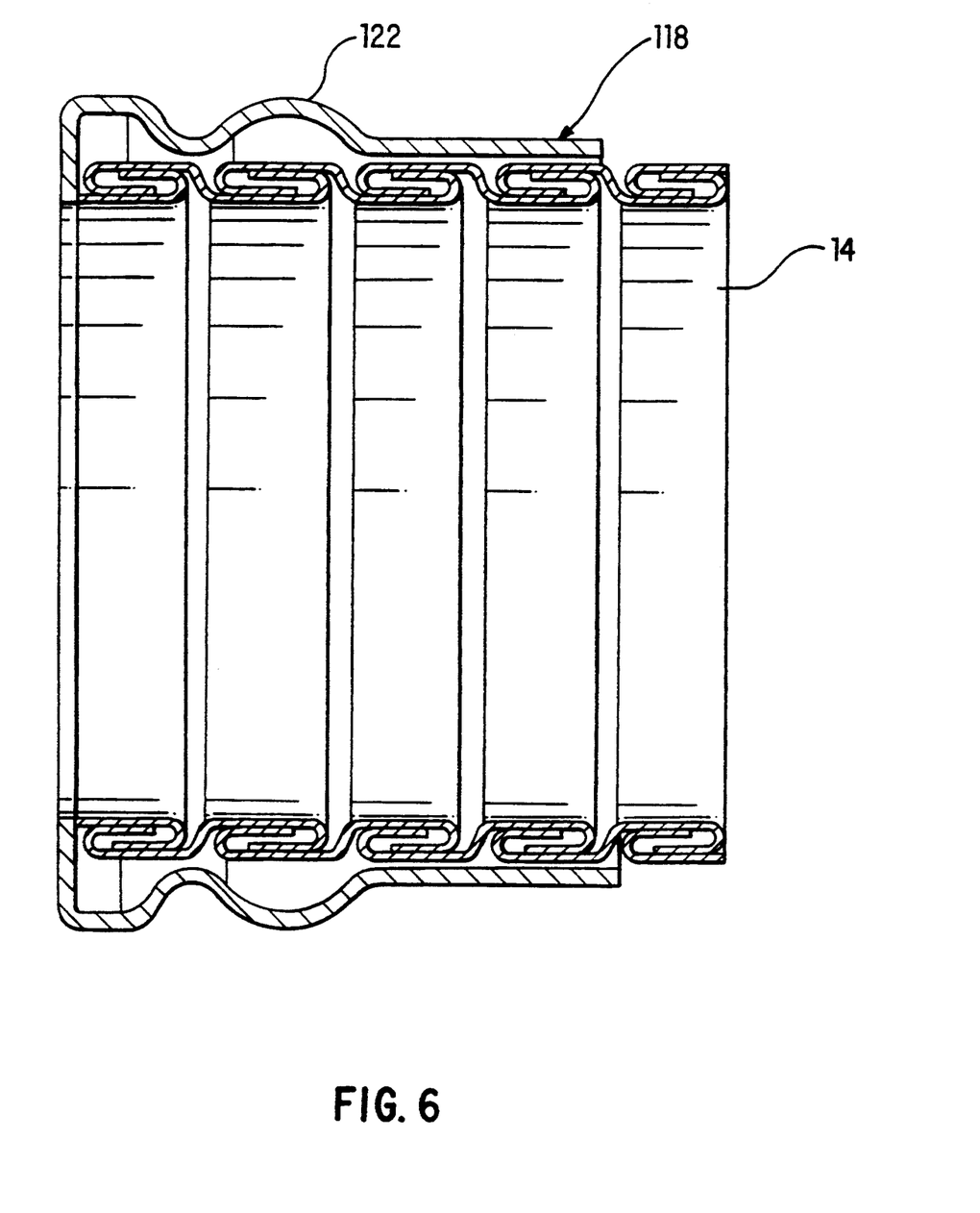
FIG. 6 is a cross-sectional view of a crimpable end piece of a variable phase positioning device according to the present invention.

FIG. 6 illustrates a second embodiment of an end piece 118. The end piece 118 is similar in construction to the end piece 118 except that a crimping ring 122 replaces the threaded surface 78. The retaining sleeve 26 used with this end piece 118 also is not threaded. The first end 106 of the retaining sleeve 26 is crimped around the crimping ring 122 thereby securing it to the end piece 118.

Figure 7:
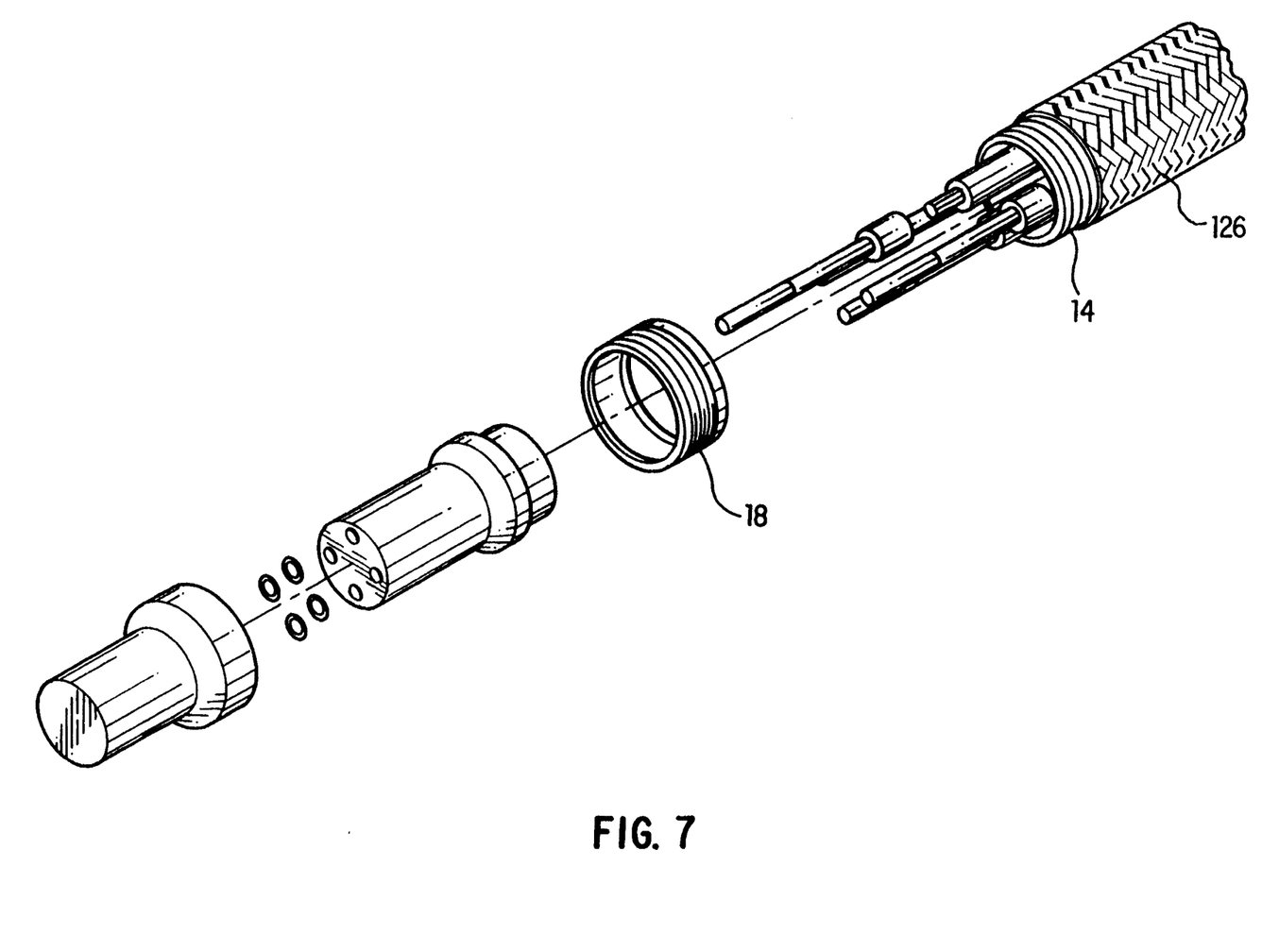
FIG. 7 is an exploded view one end of a variable phase positioning device according to the present invention having a braided ground conductor surrounding the enclosure.

FIG. 7 illustrates a braided sleeve 126 which can be placed over the housing 14 to provide an electrical ground path. The braided sleeve 126 is captivated at each end of the housing 14 by the end pieces 18/118

It should be noted that in all of the embodiments described above the preselected angle can be any angle selected by the manufacturer and the housing can be made from an electrically conductive material such that it will carry the system ground current.

We claim:
1. A variable phase positioning device comprising:
 a) a flexible housing being generally tubular in shape and having a first end and a second end;
 b) a pair of end pieces, each generally cylindrical in shape and having an inwardly extending bearing flange at one end, each said end piece being slidably received over one end of said housing until said bearing flange engages the end of said housing, said end pieces being fixedly attached to the housing, said bearing flange defining an aperture;
 c) a plurality of electrical conductors, each having a first end and a second end and being flexible, each conductor having an electrically insulating sheath, a preselected length of said sheath being removed from each end of each conductor, the conductors being slidably received within the housing;
 d) a plurality of terminals, each generally cylindrical in shape and substantially rigid, each said terminal having a terminal end, a conductor receiving end having a larger outside diameter than said terminal end and defining an aperture for receiving one of said conductor ends, a step formed at the junction of said terminal end and said conductor receiving end, and a circumferential retaining groove;
 e) means for securely holding the conductor end in said aperture of said conductor receiving end;
 f) a pair of terminal supports, each generally cylindrical in shape and made of an electrically insulating material, said supports having a first end dimensioned to be loosely received in said aperture defined by said bearing flange, a second end, and an annular bearing flange, each said terminal support defining a plurality of passages communicating between said first and second ends, said passages having a diameter dimensioned to receive said conductor receiving end of said terminal at said first end and a diameter sized to receive said terminal end of said terminal at said second end such that a step is formed at the junction of the two diameters, each said passage loosely receiving one of said terminals such that said step of said terminal engages said step of said passage, said circumferential retaining groove of said terminal being adjacent said second end of said terminal support;

g) a plurality of retaining rings, one of said rings being received in each said retaining groove of each said terminal thereby loosely captivating said terminals in said terminal support such that each said terminal my rotate freely within said passage;

h) a pair of retaining sleeves, each generally cylindrical in shape and having a first end dimensioned to be snugly received over said end piece and a second end dimensiond to be loosely received over said second end of said terminal support such that said terminal support can rotate freely within said retaining sleeve; and i) means for attaching said retaining sleeve to said end piece.

* * * * *